(12) United States Patent
    Schuchnigg

(10) Patent No.: US 11,110,989 B2
(45) Date of Patent: Sep. 7, 2021

(54) HANDLEBAR STEM CONNECTION MEANS AND BICYCLE ELEMENT

(71) Applicant: Canyon Bicycles GmbH, Koblenz (DE)

(72) Inventor: Lukas Schuchnigg, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 304 days.

(21) Appl. No.: 16/384,160

(22) Filed: Apr. 15, 2019

(65) Prior Publication Data

US 2019/0322330 A1    Oct. 24, 2019

(30) Foreign Application Priority Data

Apr. 18, 2018  (DE) .................... 20 2018 001 990.9

(51) Int. Cl.
| | |
|---|---|
| *B62K 21/22* | (2006.01) |
| *B62K 19/32* | (2006.01) |
| *B62K 21/06* | (2006.01) |
| *B62K 21/12* | (2006.01) |

(52) U.S. Cl.
    CPC .............. *B62K 21/22* (2013.01); *B62K 19/32* (2013.01); *B62K 21/06* (2013.01); *B62K 21/12* (2013.01)

(58) Field of Classification Search
    CPC ........ B62K 21/22; B62K 19/32; B62K 21/06; B62K 21/12; B62K 21/18
    See application file for complete search history.

(56) References Cited

U.S. PATENT DOCUMENTS

| | | | |
|---|---|---|---|
| 5,201,242 A | 4/1993 | Chi | |
| 5,536,102 A * | 7/1996 | Kao ..................... | B62K 21/12 403/320 |
| 5,680,798 A * | 10/1997 | Luen ..................... | B62K 21/18 280/279 |
| 5,842,385 A * | 12/1998 | Su ......................... | B62K 21/16 74/551.3 |
| 9,663,179 B2 * | 5/2017 | Wagner ................. | B62K 21/12 |
| 10,093,382 B1 * | 10/2018 | Gershenson ........... | F16B 7/042 |
| 2007/0241531 A1 * | 10/2007 | D'Aluisio ............. | B29C 70/446 280/279 |
| 2010/0282017 A1 * | 11/2010 | Hermansen ........... | B62K 25/02 74/551.3 |
| 2017/0233029 A1 | 8/2017 | Li | |
| 2018/0118300 A1 * | 5/2018 | Lin ....................... | B62K 19/32 |

FOREIGN PATENT DOCUMENTS

| | | |
|---|---|---|
| DE | 172901 | 7/1906 |
| DE | 102007014678 A1 | 10/2007 |
| DE | 202015002911 U1 | 7/2016 |
| JP | 11240480 A | 9/1999 |

* cited by examiner

*Primary Examiner* — Kevin Hurley
*Assistant Examiner* — Marlon A Arce
(74) *Attorney, Agent, or Firm* — The Webb Law Firm

(57) ABSTRACT

A handlebar stem connection mechanism for connecting a handlebar stem with a front wheel fork comprises a steerer tube connectible with the front wheel fork. Further, a handlebar stem tube connectible with the handlebar stem is provided, the handlebar stem tube surrounding the steerer tube. Using a clamping element arranged between the steerer tube and the handlebar stem tube, the steerer tube is clampingly connected with the handlebar stem tube. For fixing, in particular a screw is provided in the clamping element as the fixing element.

12 Claims, 2 Drawing Sheets

HANDLEBAR STEM CONNECTION MEANS AND BICYCLE ELEMENT

CROSS-REFERENCE TO RELATED APPLICATION

This application claims priority to German Utility Model Application No. 20 2018 001 990.9 filed Apr. 18, 2018, the disclosure of which is hereby incorporated by reference in its entirety.

BACKGROUND

Field of the Disclosure

The invention relates to a handlebar stem connection mechanism, as well as to a bicycle element.

Description of the Related Art

Handlebar stem connection mechanisms serve to connect the handlebar stem of a bicycle, which supports the handlebar, with a steerer tube of a front wheel fork. In this regard it is known that a handlebar stem encloses a top end of the steerer tube above the headtube, which end protrudes beyond the headtube of the frame when mounted. The handlebar stem is slit in this region, for example, so that the handlebar stem surrounding the steerer tube may be clampingly fastened using screws extending in a direction tangential to the steerer tube. Such fastenings have the drawback that a change in the height of the handlebar stem is possible only when the steerer tube is shortened. With a shortened steerer tube, it is no longer possible to reposition the handlebar stem upward.

Further, handlebar stem connection mechanisms are known in which the handlebar stem has a tubular protrusion that is inserted into the steerer tube. The lower side of the tubular protrusion of the handlebar stem is beveled. In this region a clamping element is provided that is also beveled. The clamping element is connected with a top of the handlebar stem by a long screw, so that by tightening the screw, the clamping element is pressed outward due to the bevel. Thereby, the tubular protrusion of the handlebar stem is clampingly fixed inside the steerer tube. This type of fastening the handlebar stem in the steerer tube in particular has the disadvantage that the steering bearings have to be fixed and pretensioned using separate parts.

SUMMARY

It is an object of the invention to provide a handlebar stem connection mechanism which allows for a simple and reliable connection between the handlebar stem and the steerer tube. Further, it is an object to provide a corresponding bicycle element.

The object is achieved according to the invention with a handlebar stem connection mechanism as defined in claim 1 and a bicycle element as defined in claim 10, respectively.

The handlebar stem connection mechanism of the present invention serves to connect a handlebar stem with a front wheel fork. The handlebar stem connection mechanism comprises a steerer tube connectible with a front wheel fork, wherein the steer tube is preferably formed integrally with the front wheel fork. The handlebar stem connection mechanism further comprises a handlebar stem tube. The same may be connected with the handlebar stem. In a preferred embodiment, the handlebar stem tube is formed integrally with the handlebar stem. In the mounted state, the handlebar stem tube surrounds the steerer tube. Here, the handlebar stem tube surrounds the steerer tube in the circumferential direction, preferably entirely. According to the invention, a clamping element is arranged between the steerer tube and the handlebar stem tube. Using the clamping element, it is possible to clampingly connect the steerer tube with the handlebar stem tube. Further, a fixing element is provided which maintains the clamping element in the clamped position.

Using the handlebar stem connection mechanism of the present invention it is possible, in particular, to adjust the height of the handlebar stem in a simple manner by changing the length of the handlebar stem tube in the longitudinal direction relative to the position of the steerer tube. If at all, it may be necessary to provide spacer elements, such as spacer rings or spacer sleeves, between a top end of the headtube of the bicycle frame and a bottom side of the handlebar stem. In particular, it is not necessary to shorten the steerer tube.

Preferably, the steerer tube has a contact surface on which the clamping element rests. Here, it is particularly preferred that the contact surface is inclined with respect to a longitudinal axis of the steerer tube. The contact surface of the steerer tube may be formed as a continuous surface or may be formed by a tube edge. In particular with tubular hollow steerer tubes, the contact surface is formed by a tube edge. Further, it is preferred that the clamping element has a clamping surface that is in contact with the contact surface of the steerer tube in the mounted state. Preferably, the clamping element is a tubular element that is beveled, wherein the bevel angle of the clamping element substantially corresponds to the bevel angle of the steerer tube. In this respect it is particularly preferred that the clamping element is wedge-shaped, wherein the clamping surface of the wedge-shaped clamping element is inclined with respect to the longitudinal axis of the handlebar stem tube in the mounted state. The longitudinal axis of the handlebar stem tube is preferably identical with the longitudinal axis of the steerer tube. Further, the inclination angles of the clamping surface and the contact surface are preferably substantially identical. In a preferred embodiment, the clamping element thus has a convexly curved outer side. The same particularly has a constant radius of curvature which substantially corresponds to the inner diameter of the handlebar stem tube if the handlebar stem tube is tubular with a circular cylindrical cross section.

For mounting, the steerer tube is inserted into the headtube of the bicycle frame from below. At the same time, the handlebar stem tube is inserted into the headtube from above so that the handlebar stem tube surrounds the steerer tube in the circumferential direction. In a preferred embodiment, the clamping element is arranged in the handlebar stem tube. The clamping element is then clampingly fixed at the desired height of the handlebar stem, so that the handlebar stem tube is fixedly connected with the steerer tube. According to the invention a fixing element is provided for this purpose. For example, a clamping fixation could first be achieved by pressing the clamping element in the longitudinal direction, so that the handlebar stem tube is connected with the steerer tube. Thereafter, the clamping element is fixed via the fixing element. This may e.g. be a fixing element inserted into the handlebar stem tube from above, such as a screw or the like that presses the clamping element downward.

In a particularly preferred embodiment the fixing element has a head in contact with an outer side of the handlebar stem tube. In the mounted state the fixing element thus preferably extends in the horizontal direction. Here, the fixing element may again be a screw fixing the clamping element in the clamped position. Further, it is particularly preferred that the fixing element is connected with a shaft that in particular extends through the clamping element. This has the advantage that by operating the fixing element, a clamping may be effected at the same time. This is done such that the tube, in the mounted state, presses against the contact surface of the steerer tube or a contact element connected with the steerer tube. By operating the fixing element, which in particular is designed as a screw, a clamping of the fixing element is thus effected in this preferred embodiment, simultaneous with the fixing.

In a particularly preferred embodiment the clamping element has a recess in which a head of the fixing element is arranged in the mounted state. Further, the fixing element has a shaft connected with the head. The shaft preferably extends through the clamping element. In the mounted state, the shaft presses against the contact surface of the steerer tube or against a contact element connected with the steerer tube. In this regard it is particularly preferred that an inner thread is provided in the clamping element and the shaft has an outer thread. By turning the fixing element, a clamping connection of the steerer tube with the handlebar stem tube can be realized via the clamping element.

In a further particularly preferred embodiment the in particular hollow handlebar stem tube has a longitudinal slit. Thus, it is possible to displace the fixing element in the longitudinal direction in the handlebar stem tube, so as to be able to adjust the desired height of the handlebar stem, preferably in a continuous manner. Moreover, it is possible to pass cables, such as brake cables, shifting cables, electric lines and the like, through the longitudinal slit in the handlebar stem tube. Such cables may e.g. be introduced from the handlebar through the handlebar stem into the handlebar stem tube and then through the longitudinal slit in the handlebar stem tube into the frame, in particular into the top tube or the down tube of the frame.

Due to the longitudinal slit preferably provided in the handlebar stem tube, the fixing element is accessible in a simple manner.

It is further preferred that the clamping element has at least one opening to enable the passage of cables, such as brake cables, shifting cables or electric lines, through the clamping element. Such cables may thus be introduced from the handlebar through the handlebar stem into the handlebar stem tube, then through the longitudinal slit in the handlebar stem tube and into the frame.

The invention further relates to a bicycle element. This element is a part of a bicycle. The bicycle element of the invention comprises a bicycle frame with a headtube. Depending on the design, the bicycle frame may further comprise a top tube, a down tube and a seat tube, as well as a sprung or unsprung rear structure. The headtube serves to receive the steerer tube, which is connected, in particular formed integrally with the headtube, and the handlebar stem tube. According to the invention, the handlebar stem connection mechanism is arranged in the handlebar stem of the bicycle element as described above with reference to preferred embodiments.

Preferably, the headtube has a slit through which the fixing element is accessible. Thereby, the fixing element, which is formed in particular as a screw, by which the clamping element is fixed can thereby be fixes in a simple manner after adjustment of the handlebar stem height and/or after pretensioning of the steering bearings.

In addition to or instead of providing accessibility to the fixing element, the slit preferably provided in the headtube may also serve to pass cables therethrough.

In a preferred development of the invention, the handlebar stem tube is surrounded by an upper steering bearing and the steerer tube is surrounded by a lower steering bearing. Possibly, the steerer tube is formed such in the region of the lower steering bearing that it has an enlarged diameter so that a bearing with a conventional diameter can be used although the steerer tube us arranged inside the handlebar stem tube.

For pretensioning the steering bearings, a receiving element is arranged in the steerer tube, which element cooperates with a tensioning element. The tensioning element is preferably supported at the handlebar stem tube or at the handlebar stem connected with the handlebar stem tube. It is particularly preferred that the tensioning element is designed as a screw element, in particular a screw. A thread of the tensioning element preferably engages a bore with an inner thread in the receiving element. By tensioning the tensioning element in a corresponding manner, the steerer tube and the handlebar stem tube or the handlebar stem are drawn together in the longitudinal direction. Thereby, the two steering bearings are pretensioned.

For mounting the bicycle element of the present invention, the steerer tube and the handlebar stem tube may thus be arranged inside the headtube together with the clamping element. Prior to fixing the clamping element, the tensioning element is tightened so that the two steering bearings are pretensioned correspondingly. Thereafter, the clamping element is arranged at the proper height, which happens automatically in particular due to the inclined contact surface of the steerer tube, so that the clamping element can be fixed in the corresponding position using the fixing element. At this time, the clamping connection of the steerer tube with the handlebar stem tube is also effected automatically. If necessary, the height of the handlebar stem tube, and thus of the handlebar stem, can be adjusted prior to the tightening of the tensioning element by providing intermediate rings and spacer elements.

The invention will be described hereinafter in detail with reference to a preferred embodiment and to the accompanying drawings.

DETAILED DESCRIPTION

Figure 1:
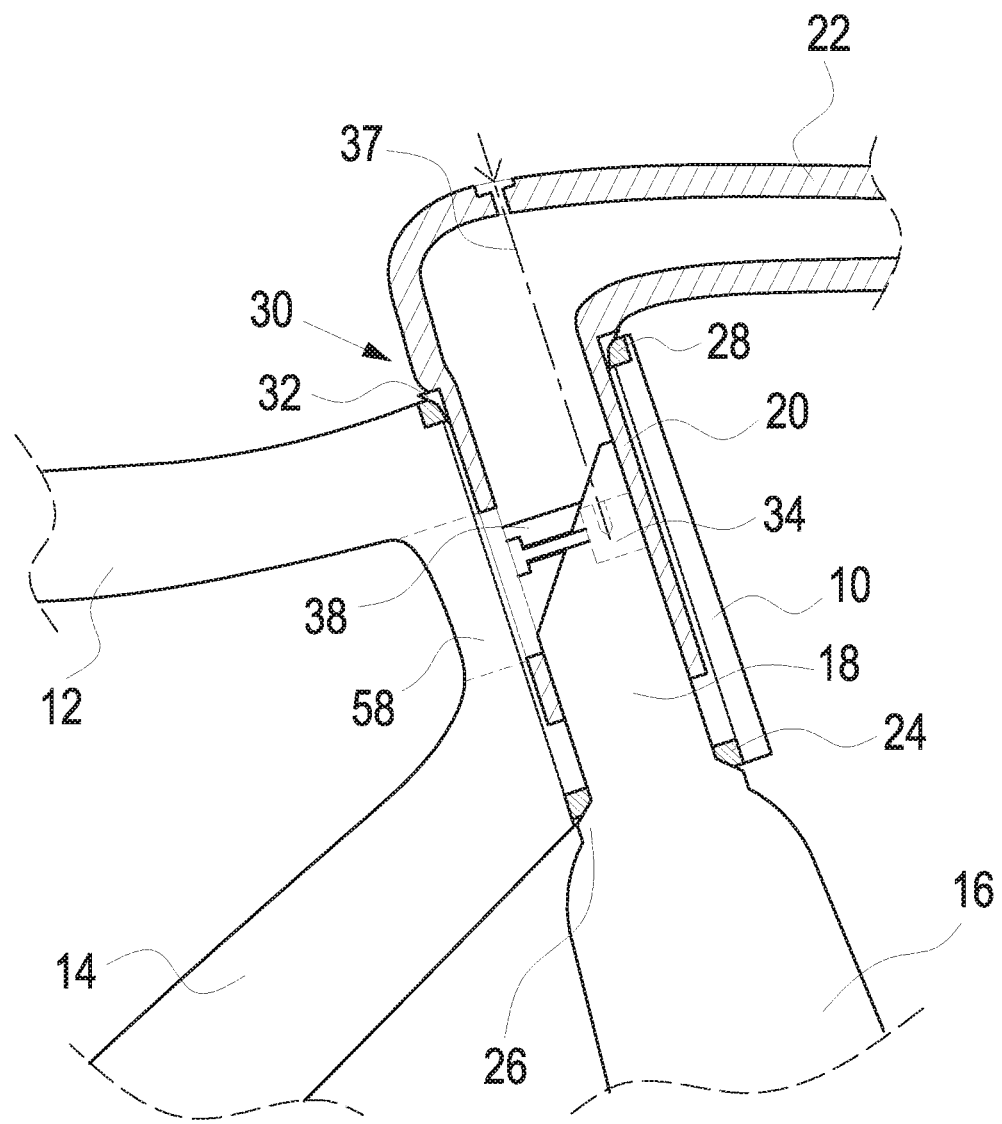
FIG. 1 is a schematic sectional view of a bicycle element.

FIG. 1 shows a bicycle element, i.e. a part of a bicycle in the region of a headtube 10. In the embodiment illustrated, the headtube 10 which is part of a bicycle frame, is connected with a top tube 12 and a downtube 14. A steerer tube 18 is arranged in the headtube 10, the steerer tube in particular being formed integrally with a front wheel fork 16. Further, a handlebar stem tube 20 is provided in the headtube 10, the handlebar stem tube surrounding the steerer tube 18 circumferentially. In the embodiment illustrated, the handlebar stem tube 20 is formed integrally with a schematically illustrated handlebar stem 22. The handlebar stem 22 supports the handlebar not shown, or is possibly also formed integrally therewith.

The steerer tube 18 is surrounded by a lower steering bearing 24 that is arranged at a chamfer or a circumferential enlargement of the steerer tube 18. Further, the steering bearing 24 is arranged in the headtube 10. An upper steering bearing 18 surrounds the handlebar stem tube 20 and is supported at a protrusion 30 of the handlebar stem, the protrusion 30 being arranged in particular in a transition region between the handlebar stem tube 20 and the handlebar stem 22 which in the embodiment illustrated is integrally connected with the handlebar stem tube 20. At least one compression ring 32 may be provided between the upper steering bearing 28 and the protrusion 30. The height of the handlebar stem can be varied depending on the thickness of the compression ring 32 or by providing a plurality of compression rings.

A receiving element 34 is arranged in an end portion of the steerer tube 18. The receiving element 34 comprises a bore 36 with an inner thread. A tensioning element, configured as a screw 37 in the embodiment illustrated, is arranged in the same. By tightening the screw 37, the two steering bearings 24, 28 are pretensioned.

Figure 2:
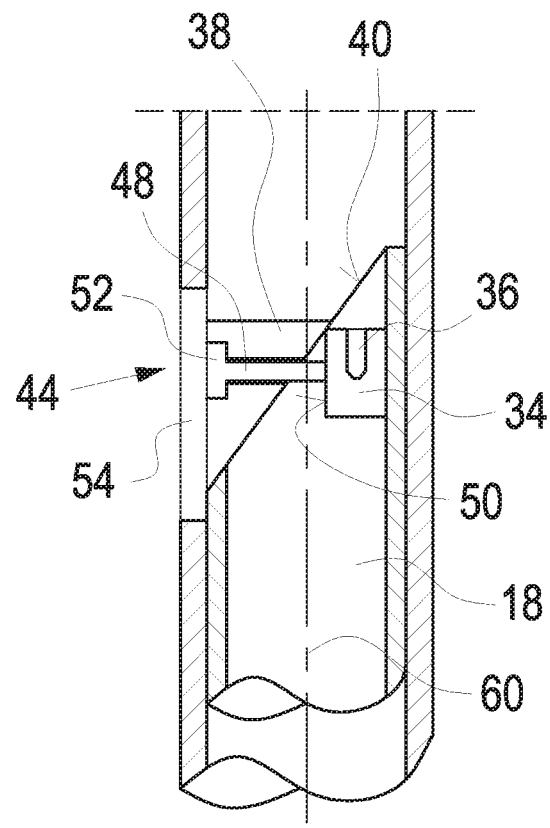
FIG. 2 is a schematic sectional view of a handlebar stem connection mechanism.
Figure 3:
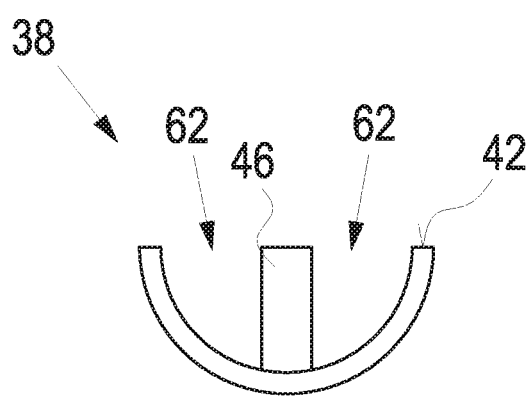
FIG. 3 is a schematic top plan view of the clamping element.
Figure 4:
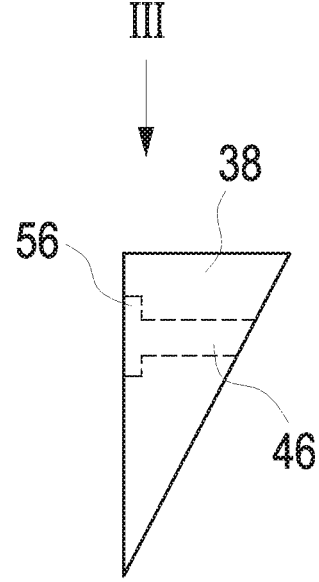
FIG. 4 is a schematic side view of the camping element.

A clamping element 38 is provided for connecting the steerer tube 18 with the handlebar stem tube 20. The in particular wedge-shaped clamping element 38 is arranged inside the handlebar stem tube 20. For fixation, the free end of the steerer tube 18 is beveled so that a contact surface 40 is formed. The contact surface 40 is formed in particular by the surface formed by the tubular steerer tube, the surface being substantially annular in top plan view. The clamping element 38, which is substantially wedge-shaped in side view (FIG. 4), has a clamping surface 42 in contact with the contact surface when in the mounted state (FIG. 2). The clamping surface substantially has a width corresponding to the width of the contact surface 40, if the clamping element 38 is made from a tube segment as can be seen in particular in FIG. 3.

For the fixation of the clamping element 38 a fixing element is further provided, which in the embodiment illustrated is configured as a screw 44. The screw 44 is arranged in a sleeve-shaped element 46 (FIG. 3) of the clamping element 38. The sleeve-shaped element 46 has an inner thread. By screwing the screw 44 into the sleeve-shaped element 46, the screw shaft 48 is pressed against a contact surface 50. In the embodiment illustrated, the contact surface 50 is formed by a front side of the receiving element 34.

A head 52 of the screw 44 is arranged in a recess 56 of the clamping element 38 such that the head 52 does not protrude. The head 52 of the screw 44 is accessible through a longitudinal slit 54 in the handlebar stem tube. A corresponding slit 56 is also provided in the headtube 10 (FIG. 1) so that the screw 44 is accessible in a simple manner.

For mounting, the steerer tube 18 is thus inserted into the headtube 10 from below and the hast 20 is inserted from above, with the clamping element 38 being already arranged in the handlebar stem tube 20. Thereafter, the two steering bearings 24, 28 are pretensioned using the screw 37. Subsequently, the steerer tube 18 is clampingly connected with the handlebar stem tube 20 by tightening the screw 44. This results in a fastening by clamping which is caused by the inclined contact surface 40 and the clamping surface 42 which is also inclined. The two surfaces have substantially the same inclination angle and are inclined in opposite directions relative to a longitudinal axis 60.

Further, cables, such as brake cables, shifting cables and/or electric wires, are passed e.g. from the handlebar through the hollow handlebar stem 22 into the frame, i.e. e.g. into the top tube 12 or the down tube 14. For this purpose, the cables are introduced through the hollow handlebar stem 22 into the handlebar stem tube 20 which is also hollow. The clamping element 38 comprises, as is visible in particular in FIG. 3, respective openings 62 laterally of the sleeve-shaped element 46, which serve to pass the cables therethrough. The cables may then be passed through the longitudinal slit 54 in the handlebar stem tube 20 into the top tube 12 or the down tube 14.

The invention claimed is:

1. A handlebar stem connection mechanism for connecting a handlebar stem with a front wheel fork, comprising:
   a steerer tube connectible with the front wheel fork,
      a handlebar stem tube connectible with the handlebar stem, the handlebar stem tube surrounding the steerer tube in a mounted state,
      a clamping element for a clamping connection of the steerer tube with the handlebar stem tube, the clamping element being arranged between the steerer tube and the handlebar stem tube, and
      a fixing element holding the clamping element in a clamped position,
      wherein the steerer tube has a contact surface on which the clamping element rests, the contact surface preferably inclined with respect to a longitudinal axis of the steerer tube, and
      wherein the clamping element has a recess in which a head of the fixing element is arranged, a shaft being connected with the head, and wherein the shaft, in the mounted state, presses against the contact surface or against a contact element connected with the steerer tube.

2. The handlebar stem connection mechanism of claim 1, wherein the clamping element has a clamping surface which, in the mounted state, rests on the contact surface of the steerer tube.

3. The handlebar stem connection mechanism of claim 2, wherein the clamping element is wedge-shaped, and wherein the clamping surface is inclined with respect to a longitudinal axis of the handlebar stem tube in the mounted state.

4. The handlebar stem connection mechanism of claim 1, wherein the fixing element has a head resting on an outer side of the handlebar stem tube and a shaft connected with the head, and wherein the shaft, in the mounted state, presses against the contact surface or against a contact element connected with the steerer tube.

5. The handlebar stem connection mechanism of claim 1, wherein the handlebar stem tube has a longitudinal slit through which the fixing element is accessible.

6. The handlebar stem connection mechanism of claim 1, wherein the handlebar stem tube is formed integrally with the handlebar stem.

7. The handlebar stem connection mechanism of claim 1, wherein the clamping element has at least one opening for passing cables therethrough.

8. A bicycle element comprising:
   a bicycle frame with a head tube, and
   the handlebar stem connection mechanism of claim 1 arranged at least in part in the head tube.

9. The bicycle element of claim 8, wherein the head tube comprises a slit through which the fixing element is accessible.

10. The bicycle element of claim 8, wherein the handlebar stem tube is surrounded by an upper steering bearing and the steerer tube is surrounded by a lower steering bearing.

11. The bicycle element of claim 10, wherein a receiving element is arranged in the steerer tube for the pretensioning of the steering bearings, the receiving element cooperating with a tensioning element supported at the handlebar stem tube or the handlebar stem connected with the handlebar stem tube.

12. A bicycle element, comprising:
- a bicycle frame with a head tube;
- a handlebar stem connection mechanism for connecting a handlebar stem with a front wheel fork arranged at least in part in the head tube, comprising:
  - a steerer tube connectible with the front wheel fork;
  - a handlebar stem tube connectible with the handlebar stem, the handlebar stem tube surrounding the steerer tube in a mounted state;
  - a clamping element for a clamping connection of the steerer tube with the handlebar stem tube, the clamping element being arranged between the steerer tube and the handlebar stem tube; and
  - a fixing element holding the clamping element in a clamped position;
- wherein the head tube comprises a slit through which the fixing element is accessible.

\* \* \* \* \*